United States Patent
Koyama et al.

(10) Patent No.: US 12,043,583 B2
(45) Date of Patent: Jul. 23, 2024

(54) METHOD OF TREATING CERAMICS AND CERAMIC MEMBER

(71) Applicant: Shinwa Industrial Co., Ltd., Ehime (JP)

(72) Inventors: Mototsugu Koyama, Ehime (JP); Masahiro Kurase, Ehime (JP); Toshio Hotta, Ehime (JP); Fusatoshi Nishida, Ehime (JP); Eisuke Yamamoto, Ehime (JP); Akihiro Shinozaki, Ehime (JP); Muneharu Kutsuna, Aichi (JP)

(73) Assignee: Shinwa Industrial Co., Ltd., Ehime (JP)

( * ) Notice: Subject to any disclaimer, the term of this patent is extended or adjusted under 35 U.S.C. 154(b) by 787 days.

(21) Appl. No.: 17/280,807

(22) PCT Filed: Sep. 27, 2019

(86) PCT No.: PCT/JP2019/038331
§ 371 (c)(1),
(2) Date: Mar. 26, 2021

(87) PCT Pub. No.: WO2020/067493
PCT Pub. Date: Apr. 2, 2020

(65) Prior Publication Data
US 2021/0403390 A1    Dec. 30, 2021

(30) Foreign Application Priority Data

Sep. 28, 2018  (JP) ................. 2018-186148

(51) Int. Cl.
  *C04B 41/00*   (2006.01)
  *B23K 26/364*  (2014.01)
(52) U.S. Cl.
  CPC ........ *C04B 41/0036* (2013.01); *B23K 26/364* (2015.10)

(58) Field of Classification Search
  CPC .. C04B 41/0036; B23K 26/364; B23K 26/362
  See application file for complete search history.

(56) References Cited

U.S. PATENT DOCUMENTS

2009/0176034 A1*  7/2009  Ruuttu ................. B23K 26/355
                                                   264/400
2015/0231703 A1*  8/2015  Bjormander ........ C23C 16/0263
                                                   407/115
(Continued)

FOREIGN PATENT DOCUMENTS

JP          5-51205 A       3/1993
JP         10-310859 A     11/1998
(Continued)

OTHER PUBLICATIONS

Translation of JP-2000158157-A (Year: 2000).*
International Search Report for Application No. PCT/JP2019/038331, dated Dec. 3, 2019, 2 pgs.

*Primary Examiner* — Elizabeth M Kerr
(74) *Attorney, Agent, or Firm* — Seed IP Law Group LLP (57) ABSTRACT

A ceramic member is produced by performing a laser treatment on a ceramic substrate as a pretreatment for a surface treatment such that grooves that can be substantially uniformly filled with a surface treatment material are formed in the surface of the ceramic substrate. Through laser irradiation of the surface, grooves with recessed surfaces formed to extend in at least one direction are provided. Flat surfaces are formed at areas between the grooves that are adjacent to each other. Pitches between the adjacent grooves are set to a range of 0.05 mm to 0.30 mm. One of the grooves has a width that progressively decreases as the depth increases and is opened on one side in the depth direction at a maximum width. The one of the grooves has an aspect ratio in a range of 0.5 to 1.3 and an opening ratio of equal to or greater than 70%.

6 Claims, 9 Drawing Sheets

(56) References Cited

U.S. PATENT DOCUMENTS

2017/0089441 A1* 3/2017 Zimmer ............. B23K 26/0622
2017/0121232 A1   5/2017 Nelson et al.
2018/0142338 A1   5/2018 Yokota et al.
2019/0389007 A1* 12/2019 Piech ................... B23K 26/066

FOREIGN PATENT DOCUMENTS

| JP | 2000-158157 A |   | 6/2000  |             |
|----|---------------|---|---------|-------------|
| JP | 2000158157 A  | * | 6/2000  | B23K 26/00  |
| JP | 2016-500028 A |   | 1/2016  |             |
| WO | 2012/070508 A1|   | 5/2012  |             |
| WO | 2016/170895 A1|   | 10/2016 |             |

* cited by examiner

| EXAMPLE | 1 | 2 | 3 | 4 | 5 | 6 | 7 |
|---|---|---|---|---|---|---|---|
| OUTPUT(w) | 2000 | 1000 | 500 | 500 | 1000 | 800 | 2000 |
| WAVELENGTH(nm) | 1070 | 1070 | 1070 | 1070 | 1070 | 1070 | 1070 |
| SPOT DIAMETER(μm) | 60 | 60 | 60 | 60 | 60 | 60 | 60 |
| ENERGY DENSITY(W/μm²) | 0.7 | 0.35 | 0.18 | 0.18 | 0.35 | 0.28 | 0.7 |
| LASER IRRADIATION SPEED(mm/s) | 4000 | 4000 | 4000 | 4000 | 4000 | 4000 | 4000 |
| NUMBER OF REPETITIONS (TIMES) | 1 | 1 | 1 | 3 | 2 | 1 | 1 |
| TREATMENT AREA(mm²) | 625 | 625 | 625 | 625 | 625 | 625 | 625 |
| TREATMENT TIME(s) | 0.7 | 1.4 | 1.4 | 4.2 | 2.8 | 1.4 | 1 |
| GROOVE WIDTH(μm) | 70 | 67 | 58 | 60 | 75 | 65 | 68 |
| GROOVE DEPTH(μm) | 85 | 40 | 30 | 61 | 83 | 35 | 88 |
| INTER-GROOVE PITCH(mm) | 0.22 | 0.11 | 0.11 | 0.11 | 0.11 | 0.11 | 0.15 |
| ASPECT RATIO | 1.21 | 0.60 | 0.52 | 1.02 | 1.11 | 0.54 | 1.29 |
| PRESENCE OF CLOUD-FORM DEPOSITED SUBSTANCES | PRESENT | | | | | | |
| AREA RATIO OF CLOUD-FORM DEPOSITED SUBSTANCES(%) | 65 | 95 | 80 | 100 | 100 | 100 | 100 |
| OPENING RATIO(%) | 80 | 93 | 98 | 97 | 93 | 94 | 72 |
| VOID AREA RATIO(%) | <5 | <5 | <5 | <5 | 11 | <5 | 13 |
| TENSILE ADHESION STRENGTH(Mpa) | 5.2 | 7.7 | 4.5 | >10 | >10 | 6.4 | 3.2 |

| COMPARATIVE EXAMPLE | 1 | 2 | 3 |
|---|---|---|---|
| OUTPUT(w) | 2000 | 1000 | 2000 |
| WAVELENGTH(nm) | 1070 | 1070 | 1070 |
| SPOT DIAMETER(μm) | 60 | 60 | 60 |
| ENERGY DENSITY(W/μm²) | 0.7 | 0.18 | 0.18 |
| LASER IRRADIATION SPEED(mm/s) | 4000 | 4000 | 4000 |
| NUMBER OF REPETITIONS (TIMES) | 1 | 3 | 1 |
| TREATMENT AREA(mm²) | 625 | 625 | 625 |
| TREATMENT TIME(s) | 1.4 | 4.2 | 1.4 |
| GROOVE WIDTH(μm) | 71 | 69 | 67 |
| GROOVE DEPTH(μm) | 84 | 180 | 81 |
| INTER-GROOVE PITCH(mm) | 0.11 | 0.11 | 0.33 |
| ASPECT RATIO | 1.18 | 2.60 | 1.21 |
| PRESENCE OF CLOUD-FORM DEPOSITED SUBSTANCES | PRESENT | | |
| AREA RATIO OF CLOUD-FORM DEPOSITED SUBSTANCES(%) | 100 | 100 | 40 |
| OPENING RATIO(%) | 51 | 88 | 75 |
| VOID AREA RATIO(%) | 35 | 35 | 15 |
| TENSILE ADHESION STRENGTH(Mpa) | 2.1 | 9.8 | 2.6 |

METHOD OF TREATING CERAMICS AND CERAMIC MEMBER

BACKGROUND

Technical Field

The present disclosure relates to a laser treatment method for ceramics of treating a ceramic substrate with a laser, a thermal spraying treatment method for ceramics of performing a thermal spraying treatment on a ceramic member (treated with a laser) obtained by the laser treatment method, and a (laser treated) ceramic member and a thermal spraying treated ceramic member obtained by these methods.

DESCRIPTION OF THE RELATED ART

Ceramics are solid materials made of inorganic compounds such as oxides, carbides, nitrides, or borides. The ceramics have high hardness and excellent heat resistance and have been used for various applications such as semiconductors, medical equipment, information devices, and products for the electronics industry. On the other hand, there is room for improvement in oxidation resistance and reaction/corrosion resistance of the ceramics. Therefore, the ceramics may be used after the surfaces thereof are coated with materials (surface treatment materials) with oxidation resistance and reaction/corrosion resistance.

Incidentally, for coating of a ceramic with a surface treatment material, there is a need to perform a pretreatment on a ceramic substrate (a ceramic that is a substrate on which a pretreatment for the coating with the surface treatment material is to be performed) to obtain a ceramic member and perform a surface treatment on the ceramic member in order to cause the ceramic and the surface treatment material to strongly adhere to each other. Although a blast treatment is generally performed as the pretreatment, a laser treatment may be performed in a case in which the blast treatment cannot be performed due to high hardness of the ceramic substrate.

For example, Patent Literature 1 describes that a thermal spraying coating film (thermal sprayed material) is caused to strongly adhere to a ceramic member by irradiating a ceramic substrate (such as silicon carbide) with a laser in ambient air to form grooves in the surface of the ceramic substrate and performing a thermal spraying treatment (surface treatment) on the (laser treated) ceramic member obtained through such a laser treatment. Also, the patent literature describes that the grooves formed in the surface of the ceramic substrate are patterned into desired shapes through irradiation with a laser.

According to the aforementioned disclosure in Patent Literature 1, an oxide film is formed on the ceramic member through a laser treatment, and the strength of adhesion between the ceramic member and the thermal sprayed material is enhanced by the oxide film. However, there is a concern that the quality of the ceramic member with the oxide film formed thereon as a ceramic product may be degraded and utilization thereof may be limited as compared with ceramic members with no oxide films formed thereon.

On the other hand, in the aforementioned disclosure in Patent Literature 1, although it is considered that the entire grooves are easily uniformly filled with the thermal sprayed material (surface treatment material) since the shapes of the grooves formed in the ceramic substrate are patterned, there is a concern that uniform filling of the entire grooves with the thermal sprayed material may be inhibited for some reasons other than the shapes.

CITATION LIST

Patent Literature

Patent Literature 1: International Publication No. WO 2016/170895

BRIEF SUMMARY

Thus, the present disclosure provides a ceramic member that can strongly adhere to a surface treatment material with which grooves are filled, by forming the grooves that can be substantially uniformly filled with the surface treatment material in a surface of a ceramic substrate when a laser treatment is performed on the ceramic substrate as a pretreatment for a surface treatment.

In various embodiments, the present disclosure provides a laser treatment method for ceramics in which a surface of a ceramic substrate is irradiated with a laser to provide a plurality of grooves with recessed surfaces formed to extend in at least one direction in the surface and to leave flat surfaces between the grooves that are adjacent to each other in the surface with pitches of equal to or greater than 0.05 mm and equal to or less than 0.30 mm between the grooves that are adjacent to each other. One of the grooves, which has a width that progressively decreases as a depth increases, is opened on one side in a depth direction of the one of the grooves at a maximum width in a cross section that perpendicularly intersects the one direction, and has a proportion of a depth (aspect ratio) of equal to or greater than 0.5 and equal to or less than 1.3 with respect to the maximum width. In a case in which burrs projecting in a direction inclined in the depth direction from the recessed surfaces or/and the flat surfaces are formed, and the burrs have groove blockage portions forming spaces between the groove blockage portions and the recessed surfaces in the depth direction, a proportion (opening ratio) of a value obtained by subtracting a length of the groove blockage portions in the cross section in the width direction from the maximum width with respect to the maximum width is set to be equal to or greater than 70%.

According to the present disclosure, it is possible to form the grooves that can be substantially uniformly filled with a surface treatment material in the surface of the ceramic substrate and to produce a ceramic member that can strongly adhere to the surface treatment material with which the grooves are filled, by setting the aspect ratio to be equal to or greater than 0.5 and equal to or less than 1.3 and setting the opening ratio to be equal to or greater than 70%.

In other words, in a case in which the aspect ratio is less than 0.5, the depth of the grooves is excessively shallow, and the surface treatment material thus does not enter deep parts of the ceramic member (i.e., the ceramic substrate on which the laser treatment has been performed), and adhesion strength between the ceramic member and the surface treatment material does not increase even if the grooves of the ceramic member are filled with the surface treatment material (that is, an anchor effect does not occur between the ceramic member and the surface treatment material). On the other hand, in a case in which the aspect ratio exceeds 1.3, the depth of the grooves is excessively deep, the deep parts of the grooves of the ceramic member are thus not filled with the surface treatment material, and adhesion strength between the ceramic member and the surface treatment material does not increase. However, it is possible to form grooves with shapes which can be substantially uniformly filled with the surface treatment material in the surface of the ceramic substrate by the aspect ratio being equal to or greater than 0.5 and equal to or less than 1.3.

Further, in a case in which the opening ratio is less than 70%, the groove blockage portions that form spaces between the groove blockage portions and the recessed surfaces, which are surfaces of the grooves, in the depth direction of the grooves and interrupt flowing of the surface treatment material into the spaces, are formed in a wide range at the burrs projecting in the direction inclined in the depth direction of the grooves in the surface of the ceramic member. It is thus difficult for the surface treatment material to reach entire parts inside the grooves of the ceramic member. However, the surface treatment material reaches substantially the entire parts inside the grooves without interruption by the burrs by the opening ratio being equal to or greater than 70%. It is thus possible to substantially uniformly fill the grooves (i.e., the grooves with an aspect ratio of equal to or greater than 0.5 and equal to or less than 1.3) with a shape that can be substantially uniformly filled with the surface treatment material with the surface treatment material without interruption by the burrs.

Therefore, it is possible to form the grooves that can be substantially uniformly filled with the surface treatment material (the grooves with a shape which can be uniformly filled with the surface treatment material without interruption by the burrs) in the surface of the ceramic substrate and to produce the ceramic member that can strongly adhere to the surface treatment material with which the grooves are filled, by setting the opening ratio of the grooves with the aspect ratio of equal to or greater than 0.5 and equal to or less than 1.3 to be equal to or greater than 70%.

Also, in the aforementioned laser treatment method for ceramics, some or all of the areas between the grooves that are adjacent to each other in the surface can be roughened by depositing the ceramic substrate that is partially melted or/and evaporated with the formation of the grooves between the grooves in the surface in a cloud form, and the proportion (opening ratio) can be set to be equal to or greater than 70% while portions forming the spaces in deposited substances deposited in the cloud form correspond to the groove blockage portions.

In this manner, it is possible to effectively roughen the areas between the grooves (inter-groove areas) that are adjacent to each other in the surface of the ceramic substrate by the deposited substances obtained by depositing the melted or/and evaporated ceramic substrate in the cloud form and to cause the inter-groove areas in the surface of the ceramic member to strongly adhere to the surface treatment material. Further, it is possible to prevent the deposited substances from interrupting the filling of the entire parts inside the grooves with the surface treatment material by setting the opening ratio to be equal to or greater than 70% while the portions forming the spaces between the portions and the recessed surfaces in the depth direction of the grooves in the deposited substances deposited in the cloud form correspond to the groove blockage portions. As such, it is possible to realize both the roughening of the inter-groove areas using the cloud-form deposited substances and maintenance of the high opening ratio of the grooves and to produce a ceramic member in which both the inter-groove areas and the parts inside the grooves can strongly adhere to the surface treatment material.

Also, in the aforementioned laser treatment method for ceramics, the plurality of provided grooves may be formed into a linear, curved, or circumferential treatment pattern or may be formed to intersect each other.

Moreover, in various embodiments, the present disclosure provides a thermal spraying treatment method for ceramics including: performing a pretreatment for thermal spraying on a ceramic substrate by the aforementioned laser treatment method, and performing a thermal spraying treatment on the laser treated ceramic member obtained by the pretreatment for the thermal spraying. The thermal spraying treatment is to fill the grooves formed in the laser treated ceramic member with a thermal sprayed material to cause the thermal sprayed material and the laser treated ceramic member to adhere to each other. A void area ratio of the one of the grooves is equal to or less than 20%, wherein the void area ratio is a proportion of a hollow volume in the one of the grooves with respect to a capacity of the one of the grooves in a state in which the grooves are filled with the thermal sprayed material.

According to the present disclosure, it is possible to substantially uniformly fill the grooves formed in the surface of the laser treated ceramic member with the thermal sprayed material and to cause the thermal sprayed material with which the grooves are filled and the laser treated ceramic member to strongly adhere to each other. In other words, the thermal sprayed material (surface treatment material) in a melted or half-melted state is sprayed in the depth direction of the grooves formed in the laser treated ceramic member in the thermal spraying treatment. Therefore, in a case in which the grooves of the laser treated ceramic member have a lower opening ratio due to the groove blockage portions, the thermal sprayed material sprayed in the depth direction of the grooves does not reach end portions (recessed surfaces) of the grooves in the depth direction due to the groove blockage portions, and it is thus difficult to uniformly fill the grooves with the thermal sprayed material. However, according to the present disclosure, the aspect ratio and the opening ratio are set within the aforementioned ranges, the thermal sprayed material sprayed to the grooves of the laser treated ceramic member thus reaches substantially the entire parts inside the grooves, and it is possible to cause the laser treated ceramic member and the thermal sprayed material to strongly adhere to each other.

Also, in various embodiments, the present disclosure provides a ceramic member in which a plurality of grooves are provided with recessed surfaces formed to extend in at least one direction in a surface of a base, and areas between the grooves that are adjacent to each other in the surface are formed into flat surfaces with pitches of equal to or greater than 0.05 mm and equal to or less than 0.30 mm between the grooves that are adjacent to each other. One of the grooves has a width that progressively decreases as a depth increases, is opened on one side in a depth direction of the one of the grooves at a maximum width in a cross section that perpendicularly intersects the one direction, and has a proportion of a depth (aspect ratio) of equal to or greater than 0.5 and equal to or less than 1.3 with respect to the maximum width. In a case in which burrs are formed projecting in a direction inclined in the depth direction from the recessed surfaces or/and the flat surfaces and the burrs have groove blockage portions forming spaces between the groove blockage portions and the recessed surfaces in the depth direction, a proportion (opening ratio) of a value obtained by subtracting a length of the groove blockage portions in the cross section in the width direction from the maximum width with respect to the maximum width is set to be equal to or greater than 70%.

According to the present disclosure, the grooves which can be substantially uniformly filled with the surface treatment material are formed in the surface, and it is possible to obtain a ceramic member that can strongly adhere to the surface treatment material with which the grooves are filled, by the aspect ratio being equal to or greater than 0.5 and equal to or less than 1.3 and by the opening ratio being equal to or greater than 70% similarly to the aforementioned disclosure.

Also, in the aforementioned ceramic member, in the surface, some or all of the areas between the grooves that are adjacent to each other in the surface may be roughened by the areas between the grooves being formed in a cloud form, and the proportion (opening ratio) may be set to be equal to or greater than 70% while portions forming the spaces in the portions formed in the cloud form in the surface correspond to the groove blockage portions.

In this manner, the areas between the grooves (inter-groove areas) that are adjacent to each other in the surface of the base are effectively roughened, and it is possible to obtain a ceramic member in which the inter-groove areas in the surface of the base can strongly adhere to the surface treatment material. Further, it is possible to obtain a ceramic member that prevents the portions formed in the cloud form from interrupting the filling of the entire parts inside the grooves with the surface treatment material by setting the opening ratio to be equal to or greater than 70% while the portions forming the spaces between the portions and the recessed surfaces in the depth direction of the grooves in the portions formed in the cloud form in the surface of the base correspond to the groove blockage portions. As such, it is possible to realize both the roughening of the inter-groove areas using the portions formed in the cloud form and maintenance of the high opening ratio of the grooves and to obtain a ceramic member in which both the inter-groove areas and the parts inside the grooves can strongly adhere to the surface treatment material.

Also, in the aforementioned ceramic member, the plurality of provided grooves may be formed into a linear, curved, or circumferential treatment pattern or may be formed to intersect each other.

Moreover, in various embodiments, the present disclosure provides a thermal spraying treated ceramic member including: the aforementioned ceramic member (laser treated ceramic member), and a thermal sprayed material with which the grooves formed in the ceramic member are filled, the thermal sprayed material being caused to adhere to the ceramic member, in which a void area ratio of one of the grooves is equal to or less than 20%, and the void area ratio is a proportion of a hollow volume in the one of the grooves with respect to a capacity of the one of the grooves in a state in which the grooves are filled with the thermal sprayed material.

In this manner, it is possible to substantially uniformly fill the grooves formed in the surface of the laser treated ceramic member with the thermal sprayed material and to obtain a thermal spraying treated ceramic member in which the thermal sprayed material with which the grooves are filled and the laser treated ceramic member are caused to strongly adhere to each other.

Therefore, as described above, according to the present disclosure, it is possible to produce a ceramic member which can strongly adhere to a surface treatment material with which grooves are filled, by forming the grooves which can be substantially uniformly filled with the surface treatment material in a surface of a ceramic substrate when a laser treatment is performed on the ceramic substrate as a pre- treatment for a surface treatment. Also, according to the present disclosure, it is possible to produce a thermal spraying treated ceramic member in which the ceramic member and a thermal sprayed material are caused to strongly adhere to each other.

BRIEF DESCRIPTION OF THE SEVERAL VIEWS OF THE DRAWINGS

FIG. 5 is a table for explaining test examples of the laser treatment method and the thermal spraying treatment method for ceramics according to the present disclosure.

FIG. 6-1 shows photographs of appearances (all examples) of groove portions formed in surfaces of ceramic substrates using lasers in the test examples shown in FIG. 5. Note that the photograph of the appearance of the groove portions in Example 4 is the same as the one in FIG. 3($b$).

FIG. 6-2 shows photographs of appearances (all comparative examples) of groove portions formed in surfaces of ceramic substrates using lasers in the test examples shown in FIG. 5.

FIG. 6-3 shows photographs of cross sections of the groove portions after a thermal spraying treatment is performed on the ceramic members with the grooves formed using the lasers in the test examples (only representative examples) shown in FIG. 5. Note that the photograph of the cross section of the groove portions in Example 4 is the same as the one in FIG. 3($a$).

DETAILED DESCRIPTION

Next, an embodiment for implementing the present disclosure will be described in detail with reference to the drawings.

First, a laser treatment method and a thermal spraying treatment method for ceramics, a ceramic member, and a thermal spraying treated ceramic member according to the present disclosure will be described.

Figure 1:
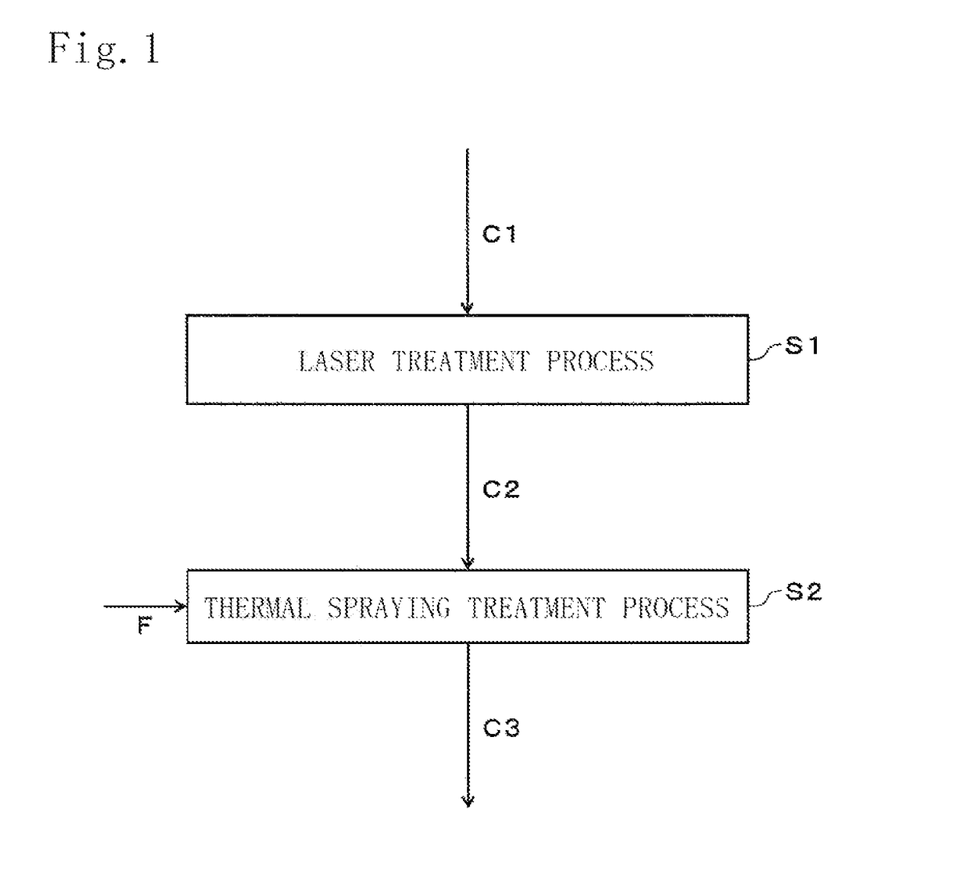
FIG. 1 is a diagram for explaining a ceramic treatment method to which a laser treatment method and a thermal spraying treatment method for ceramics according to the present disclosure are applied.

FIG. 1 is a diagram for explaining a ceramic treatment method to which the laser treatment method and the thermal spraying treatment method for ceramics according to the present disclosure are applied. As illustrated in the drawing, the ceramic treatment method includes: a laser treatment process S1 of performing a laser treatment in a surface of a ceramic substrate C1 to obtain a laser treated ceramic member C2; and a thermal spraying treatment process S2 of performing a thermal spraying treatment on the laser treated ceramic member C2 with a thermal sprayed material F to obtain a thermal spraying treated ceramic member C3.

Here, the ceramic substrate C1 means a ceramic that is a substrate on which a pretreatment for coating with the thermal sprayed material F (surface treatment material) is to be performed. Also, the ceramic is a solid material made of an inorganic compound such as an oxide, a carbide, a nitride, or a boride. Moreover, it is possible to use silicon carbide, boron carbide, silicon nitride, boron nitride, aluminum nitride, alumina, yttria, zirconia or the like as the ceramic used for the ceramic substrate C1.

Further, metal, an alloy containing metal as a main constituent, a ceramic, a composite ceramic containing a ceramic as a main constituent, cermet, or the like is used as the thermal sprayed material F. Here, it is possible to use tungsten, molybdenum, niobium, titanium, tantalum, or the like as metal. Also, it is possible to use alumina, yttria, zirconia, or the like as the ceramic that serves as the thermal sprayed material F. Although it is preferable to use a plasma thermal spraying method as the thermal spraying method, it is also possible to use a thermal spraying method other than the plasma thermal spraying method.

Figure 2:
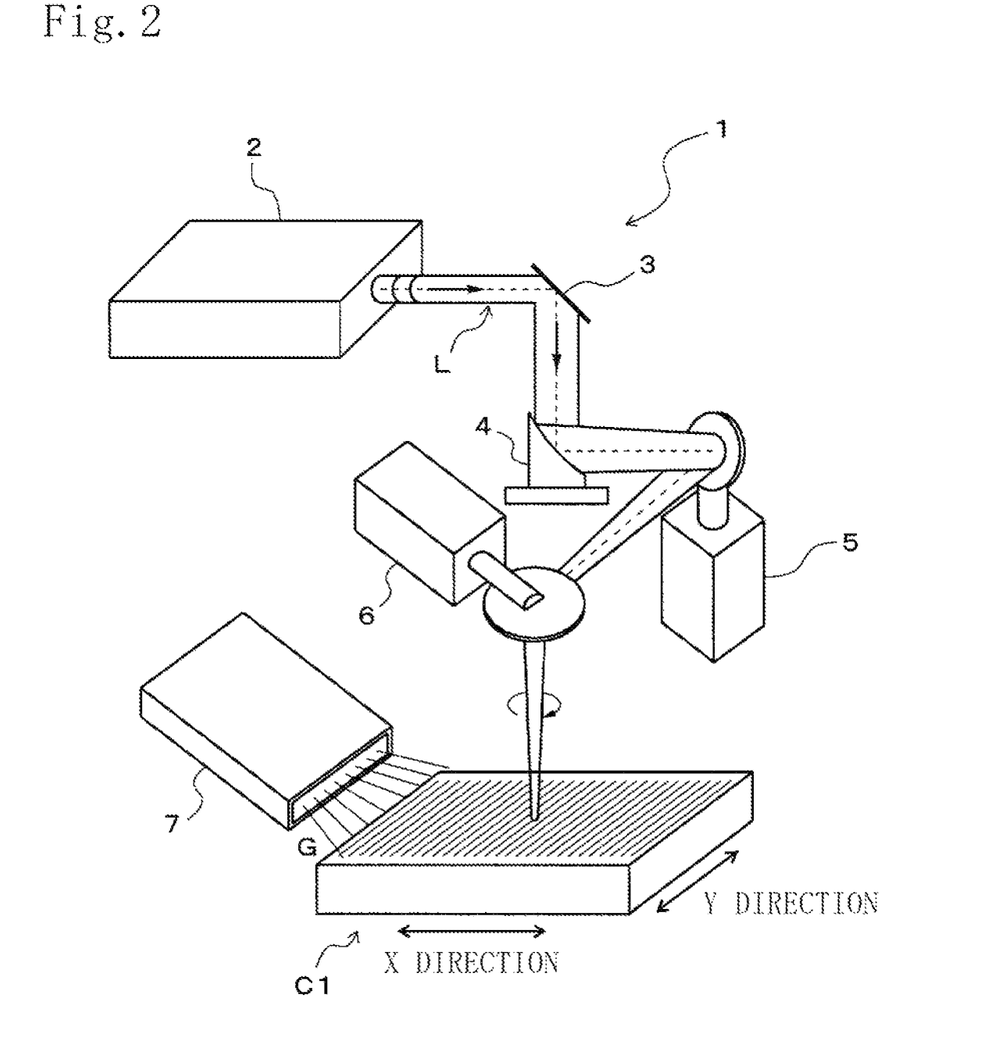
FIG. 2 is an overview diagram illustrating a laser treatment device used in a laser treatment process illustrated in FIG. 1.

FIG. 2 is an overview diagram illustrating a laser treatment device 1 used in the laser treatment process S1 illustrated in FIG. 1. As illustrated in the drawing, the laser treatment device 1 includes: a laser oscillator 2 that oscillates a laser L; a direction conversion mirror 3 that converts the direction of the laser L oscillated by the laser oscillator 2; a focusing mirror 4 that focuses the laser L reflected by the direction conversion mirror 3; an X scanner 5 that reflects the laser L focused by the focusing mirror 4 to adjust a laser irradiation position on the ceramic substrate C1 in an X direction (the long-side direction of the ceramic substrate C1); a Y scanner 6 that reflects the laser L reflected by the X scanner 5 to adjust a laser irradiation position on the ceramic substrate C1 in a Y direction (the short-side direction of the ceramic substrate C1); and a gas supply device 7 that supplies non-oxidizable gas G to the surface of the ceramic substrate C1.

As the laser L oscillated by the laser oscillator 2, it is possible to use any of a continuously oscillated laser and a pulse oscillated laser. Also, it is possible to use a fiber laser, a $YVO_4$ laser, an excimer laser, a $CO_2$ laser, an ultraviolet laser, a YAG laser, a semiconductor laser, or the like as the laser L.

The gas supply device 7 supplies the non-oxidizable gas G to the surface of the ceramic substrate C1 when the ceramic substrate C1 is irradiated with the laser L. Here, the non-oxidizable gas G is gas to prevent (shield) oxidation of the surface of the ceramic substrate C1 when the ceramic substrate C1 is irradiated with the laser. It is possible to use nitrogen gas, argon gas, helium gas, mixture gas of these kinds of gas, and the like as the non-oxidizable gas G.

Figure 3:
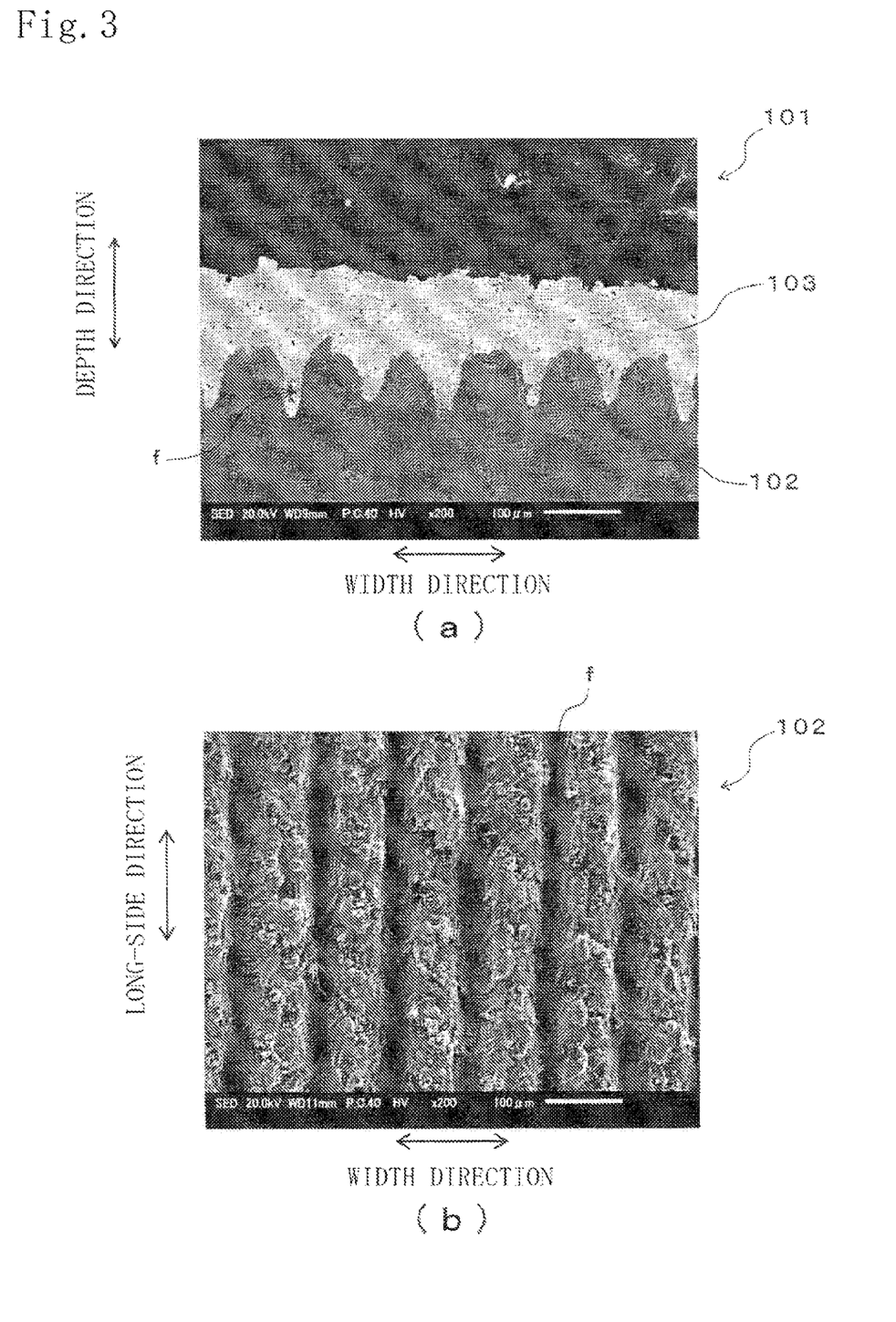
FIG. 3 is a diagram illustrating a ceramic member according to the present disclosure, where FIG. 3($a$) is a diagram illustrating a cross section of a thermal spraying treated ceramic member and FIG. 3($b$) is a diagram illustrating flat surfaces of a laser treated ceramic member.

FIG. 3 is a diagram illustrating the ceramic member according to the present disclosure, where FIG. 3(a) is a cross section of a thermal spraying treated ceramic member 101 and FIG. 3(b) is a diagram illustrating flat surfaces of a laser treated ceramic member 102. Note that the long-side direction, the width direction, and the depth direction illustrated in FIGS. 3(a) and 3(b) mean the long-side direction, the width direction, and the depth direction of grooves f illustrated in the drawings, respectively. Also, the thermal spraying treated ceramic member 101, the substrate 102 (laser treated ceramic member 102), and a thermal sprayed material 103 illustrated in FIGS. 3(a) and 3(b) correspond to the thermal spraying treated ceramic member C3, the laser treated ceramic member C2, and the thermal sprayed material F illustrated in FIG. 1, respectively.

As illustrated in FIG. 3, the thermal spraying treated ceramic member 101 includes: a substrate 102 that is a base of the thermal spraying treated ceramic member 101, and a thermal sprayed material 103, with which the substrate 102 is coated in an adhesive manner. In the thermal spraying treated ceramic member 101, a plurality of grooves f are linearly formed to extend in the long-side direction (one direction) illustrated in FIG. 3(b) and are provided at predetermined intervals in the width direction illustrated in FIGS. 3(a) and 3(b). Also, the thermal spraying treated ceramic member 101 is the thermal sprayed material 103 and the substrate 102 caused to adhere to each other by filling the grooves f formed in the substrate 102 with the thermal sprayed material 103 in the thermal spraying treatment process S2 illustrated in FIG. 1.

As illustrated in FIG. 3(b), cloud-form deposited substances are formed over the entire inter-groove portions (entire surfaces) in the substrate 102. These cloud-form deposited substances will be described in detail in explanation of FIG. 4(b) below.

Figure 4:
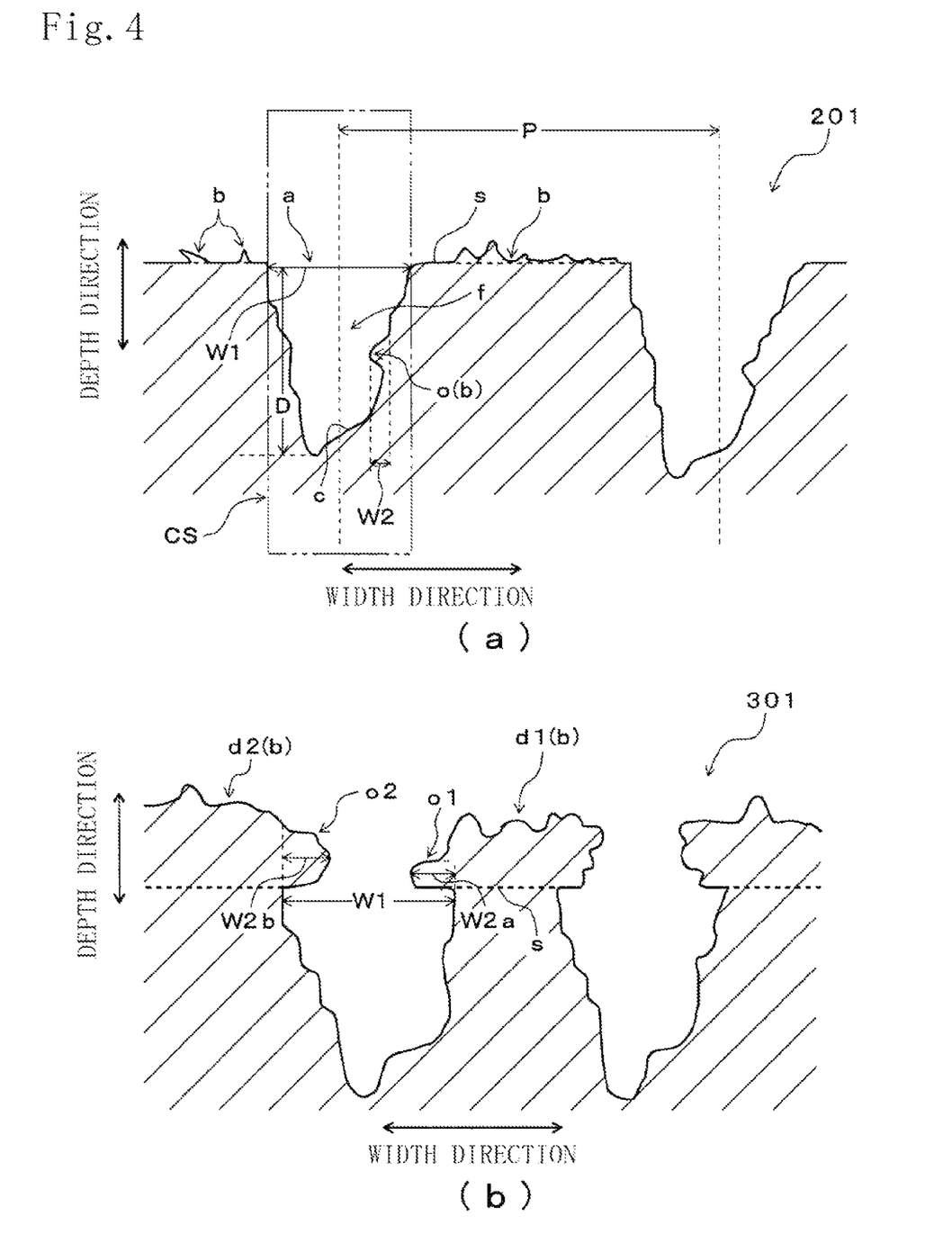
FIG. 4 is a diagram for explaining a configuration of grooves formed in the ceramic member according to the present disclosure, where FIG. 4($a$) is a diagram illustrating an example of a configuration of and near the grooves in the ceramic member and FIG. 4($b$) is a diagram illustrating another example of a configuration of and near the grooves in the ceramic member.

FIG. 4 is a diagram for explaining a configuration of the grooves formed in the ceramic member according to the present disclosure, where FIG. 4(a) is a diagram illustrating an example of a configuration of and near the grooves in the ceramic member and FIG. 4(b) is a diagram illustrating another example of a configuration of and near the grooves in the ceramic member.

The surface of a laser treated ceramic member 201 (corresponding to the laser treated ceramic member C2 illustrated in FIG. 1) illustrated in FIG. 4(a) is formed from recessed surfaces (bottom surfaces) c, inter-groove surfaces s, and surfaces of deposited substances (burrs) b. The recessed surfaces c extend in a linear direction (corresponding to the closer/further-side direction in FIG. 4(a)) and has a width that progressively decreases as the depth increases. Also, spaces formed by the recessed surfaces c are the grooves f. Moreover, the inter-groove surfaces s are flat surfaces between grooves f that are adjacent to each other in the surface of the laser ceramic member 201. In addition, the deposited substances (burrs) b are portions projecting in a direction inclined in the depth direction of the grooves f from the recessed surfaces c or/and the inter-groove surfaces s. Also, the grooves f are opened in one side in the depth direction (openings a are formed) at a maximum width W1 in a cross section CS that perpendicularly intersects the linear direction (corresponding to the closer/further-side direction in FIG. 4(a)) that is a direction in which the grooves f extend. Further, the deposited substances (burrs) b have groove blockage portions o that form spaces between the groove blockage portions o and the recessed surfaces c in the depth direction of the grooves f.

Here, pitches P mean distances between centers of grooves f that are adjacent to each other in the surface of the laser treated ceramic member 201. Also, the pitches P are equal to or greater than 0.05 mm and equal to or less than 0.30 mm. In addition, the aspect ratio is a ratio represented as depth D/maximum width W1. The aspect ratio is equal to or greater than 0.5 and equal to or less than 1.3. Further, an opening ratio is a proportion represented as (maximum width W1−groove blockage width W2)×100/maximum width W1. The opening ratio is equal to or greater than 70% and is preferably equal to or greater than 80%. Note that the depth D means a maximum depth of the grooves f in the cross section CS. Also, the maximum width W1 means a maximum width of the grooves f in the cross section CS. Further, the groove blockage width W2 is the length of the groove blockage portions o (the length of the grooves f in the width direction) in the cross section CS.

As such, it is possible to set a void area ratio to be equal to or less than 20% (preferably equal to or less than 15%), to set a tensile adhesion strength to be equal to or greater than 3 MPa (preferably equal to or greater than 5 MPa) in the thermal spraying treated ceramic member (not illustrated) produced by filling the grooves f of the laser treated ceramic member 201 with the thermal sprayed material (not illustrated) by adjusting the aspect ratio and the opening ratio within the aforementioned ranges, and thereby to produce a thermal spraying treated ceramic member (not illustrated) that satisfies a practicable criterion. Here, the void area ratio means a proportion (percentage) of the volume of the hollows (the spaces inside the grooves f which are not filled with the thermal sprayed material) inside the grooves f of the thermal spraying treated ceramic member with respect to the capacity inside the grooves f (the capacity of the spaces defined by the recessed surfaces c and the openings a). Further, tensile adhesion strength means tensile power of the thermal spraying treated ceramic member per unit area when the thermal sprayed material peels off from an interface (an extension surface of the inter-groove surfaces s) of the laser treated ceramic member 201 in a case in which the thermal sprayed material with which the grooves f are filled is pulled from the laser treated ceramic member 201.

In a laser treated ceramic member 301 illustrated in FIG. 4(b), the deposited substances (burrs) b projecting from the inter-groove surfaces s constitute cloud-form deposited substances d1 and d2 (corresponding to the cloud-form deposited substances observed on the surfaces of the inter-groove portions illustrated in FIG. 3(b). The cloud-form deposited substances d1 and d2 are formed by depositing the ceramic substrate C1 partially melted or/and evaporated with the formation of the grooves in a cloud form between the grooves f that are adjacent to each other in the surface of the ceramic substrate C1 and thereby roughening some or all of the areas between the grooves f in the surface of the ceramic substrate C1 in the laser treatment process S1 illustrated in FIG. 1. Here, the opening ratio of the laser treated ceramic member 301 is equal to or greater than 70% and is preferably equal to or greater than 80% while the cloud-form deposited substances d1 and d2 are considered to be the deposited substances (burrs) b. Specifically, the opening ratio of the laser treated ceramic member 301 is represented by (W1−W2a−W2b)×100/W1 using a groove blockage width W2a of the groove blockage portion o1 of the cloud-form deposited substance d1 and a groove blockage width W2b of the groove blockage portion o2 of the cloud-form deposited substance d2.

Next, test examples of the ceramic treatment method and the ceramic member according to the present disclosure will be described.

First, test conditions will be described with reference to FIGS. 1 and 2. In the test, a laser treatment is performed on the ceramic substrate C1 using the ceramic treatment device 1, and a thermal spraying treatment is then performed on the laser treated ceramic member C2. Here, a fiber laser of a continuous wave is used for the laser oscillator 2, and nitrogen gas is used as the non-oxidizable gas G supplied by the gas supply device 7 in the laser treatment device 1. Also, in the thermal spraying treatment, $Y_2O_3$ is used as the thermal sprayed material F to perform plasma thermal spraying.

Here, in the left sections in FIG. 5, "Output" means an output of a laser, "Wavelength" means a wavelength of the laser, "Spot diameter" means a diameter of a spot at which the irradiation with the laser L is performed by the laser oscillator 2, "Energy density" means an output density of the laser, "Laser irradiation speed" means a speed at which the laser irradiation spot is caused to move on the ceramic substrate C1, "Number of repetitions" means the number of times the same location of the ceramic substrate C1 is irradiated with the laser L, "Treatment area" means an area in which the ceramic substrate C1 is irradiated with the laser L, and "Treatment time" means a time during which the ceramic substrate C1 is irradiated with the laser L.

Further, in the left sections in FIG. 5, "Groove width" means the maximum width W1 illustrated in FIG. 4, "Groove depth" means the depth D illustrated in FIG. 4, "Inter-groove pitch" means the pitches P illustrated in FIG. 4, "Aspect ratio" means groove depth/groove width, and the opening ratio, the void area ratio, and the tensile adhesion strength have meanings as described above in the explanation of FIG. 4. Also, "Area ratio of cloud-form deposited substances" is a percentage of the area where the cloud-form deposited substances (burrs) are formed in the inter-groove areas.

Here, "Elcometer (R) 510, Model S" manufactured by Elcometer Limited was used as a measurement device for the tensile adhesion strength.

Also, problems to be solved by the present disclosure are (1) to form grooves which can be substantially uniformly filled with a surface treatment material in surfaces of ceramic substrates and thereby (2) to produce a ceramic member that can strongly adhere to the surface treatment material with which the grooves are filled. Here, it is assumed that a requirement for (1) described above is satisfied if the void area ratio is equal to or less than 20% (practicable reference value) and a requirement for (2) described above is satisfied if the tensile adhesion strength is equal to or greater than 3 MPa (practicable reference value).

FIG. 5 shows that in Comparative Example 2 in which the aspect ratio is not equal to or greater than 0.5 and equal to or less than 1.3 (exceeds 1.3), the opening ratio is high (equal to or greater than 70%), the tensile adhesion strength is also high (equal to or greater than 3 MPa), and the void area ratio is high (exceeds 20%). In other words, in Comparative Example 2, the tensile adhesion strength is enhanced simply by increasing the depth of the grooves, and the tensile adhesion strength is not enhanced by substantially uniformly filling the grooves with the thermal sprayed material. Therefore, Comparative Example 2 cannot solve the aforementioned problem (1) of the present disclosure.

On the other hand, in Examples 1 to 7 and Comparative Example 1, the aspect ratios are equal to or greater than 0.5 and equal to or less than 1.3, and opening ratios are different from each other. In Comparative Example 1, the void area ratio is 35% (exceeds 20%), the tensile adhesion strength is 2.1 MPa (less than 3 MPa), and it is not possible to solve either the aforementioned problems (1) or (2) of the present disclosure. However, in Examples 1 to 7, the void area ratios are equal to or less than 20%, the tensile adhesion strength is equal to or greater than 3 MPa, and it is possible to solve the aforementioned problems (1) and (2) of the present disclosure. For easy understanding of relationships among the opening ratios, the void area ratios, and the tensile adhesion strength in Examples 1 to 7 and Comparative Example 1, the relationships are shown in a graph in FIG. 7. Also, if the area ratios of the cloud-form deposited substances are equal to or greater than 45% or are preferably equal to or greater than 65%, it is possible to effectively enhance the tensile adhesion strength.

FIG. 6-1 shows photographs of appearances (all examples) of groove portions formed in the surfaces of the ceramic substrates using lasers in the test examples shown in FIG. 5. Note that the photograph of the appearance of the groove portions in Example 4 is the same as the one in FIG. 3(b). FIG. 6-2 shows photographs of appearances (all comparative examples) of groove portions formed in the surfaces of the ceramic substrates using lasers in the test examples shown in FIG. 5. FIG. 6-3 shows photographs of cross sections of the groove portions after a thermal spraying treatment is performed on the ceramic members with the grooves formed using the lasers in the test examples (only representative examples) shown in FIG. 5. Note that the photograph of the cross section of the groove portions in Example 4 is the same as the one in FIG. 3(a). The groove widths, the groove depths, the inter-groove pitches, the aspect ratios, presence of the cloud-form deposited substances, the area ratios of the cloud-form deposited substances, the opening ratios, and the void area ratios shown in FIG. 5 are obtained on the basis of the photographs of the appearances and photographs of the cross sections described above.

Figure 61:
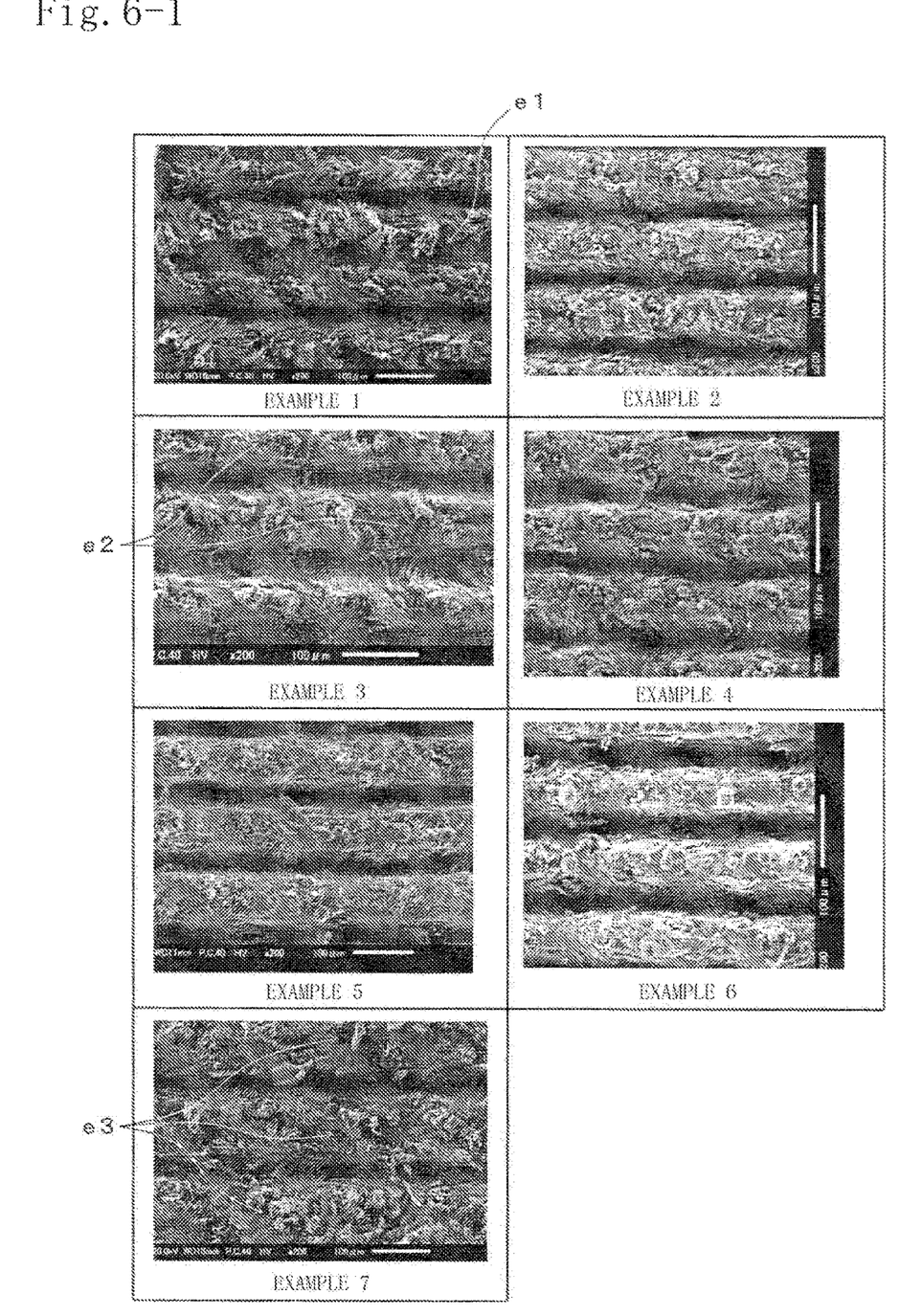
Figure 62:
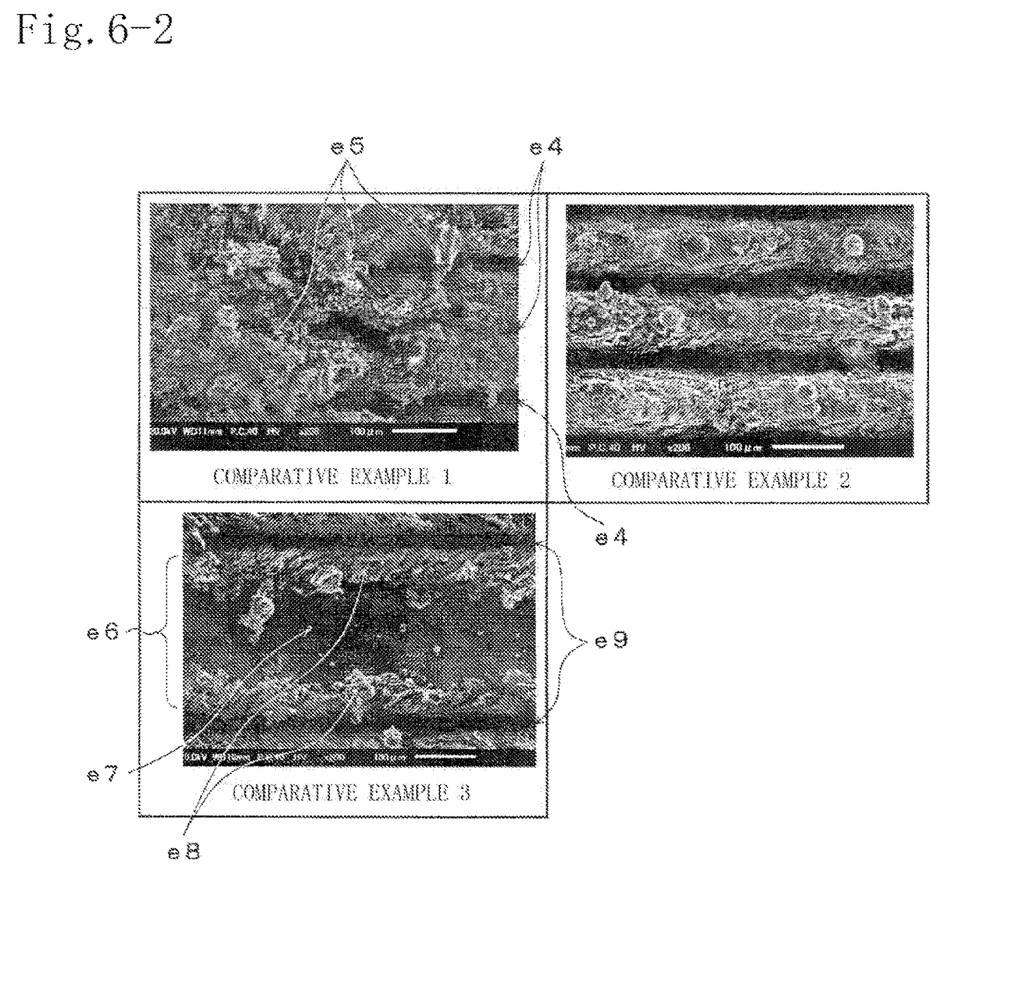
Figure 63:
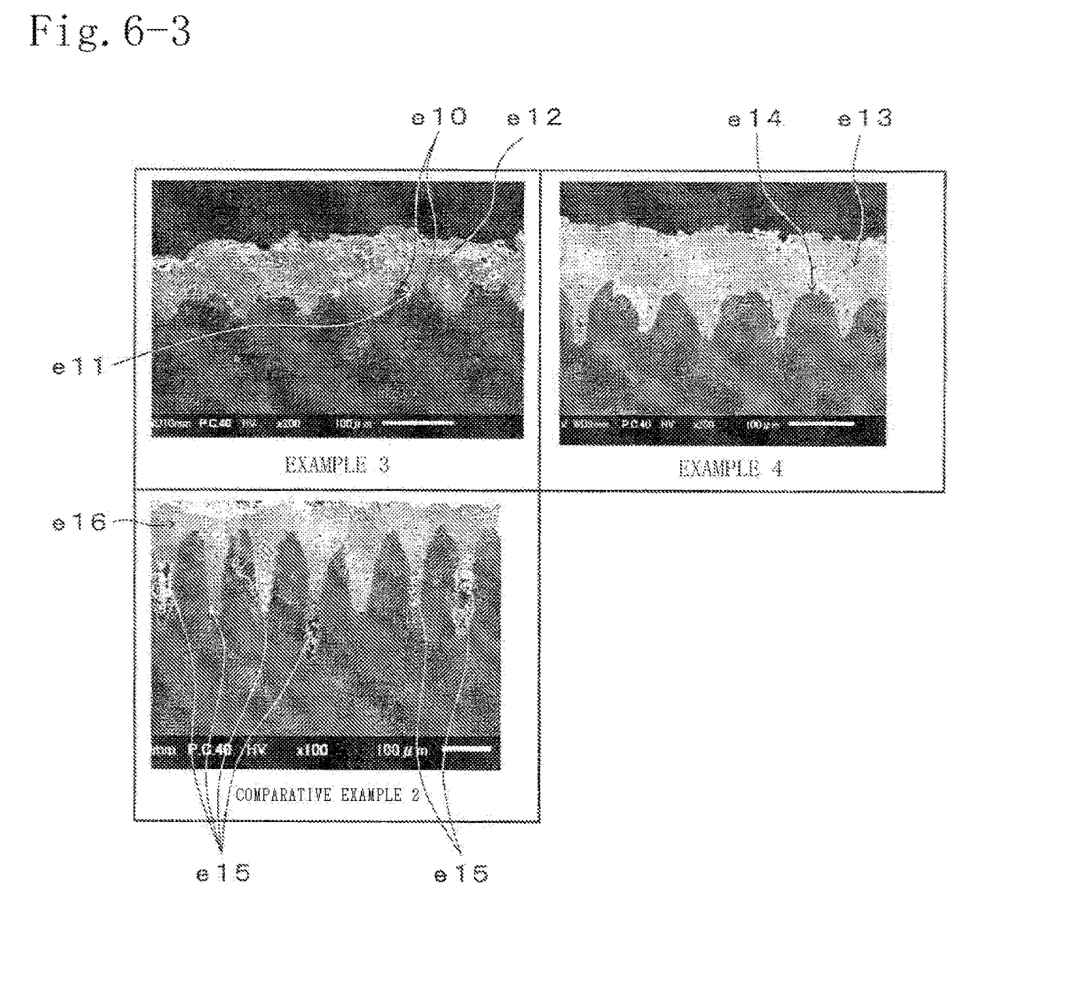

In FIG. 6-1, reference character e1 illustrates inter-groove portions that are not covered with the cloud-form deposited substances in Example 1. Reference character e2 illustrates inter-groove portions that are not covered with cloud-form deposited substances in Example 3. Reference character e3 illustrates inter-groove portions that are not covered with cloud-form deposited substances in Example 7. In FIG. 6-2, reference character e4 illustrates grooves in Comparative Example 1. Reference character e5 illustrates a state in which grooves have been buried by cloud-form deposited substances and the opening ratio has decreased in Comparative Example 1. Reference character e6 illustrates inter-groove portions in Comparative Example 3. Reference character e7 illustrates deposited substances in Comparative Example 3. Reference character e8 illustrates cloud-form deposited substances in Comparative Example 3. Reference character e9 illustrates grooves in Comparative Example 3. In FIG. 6-3, reference character e11) illustrates cloud-form deposited substances in Example 3. Reference character e11 illustrates inter-groove portions with no cloud-form deposited substances formed thereon in Example 3. Reference character e12 illustrates a thermal sprayed material in Example 3. Reference character e13 illustrates a thermal sprayed material in Example 4. Reference character e14 illustrates a state in which entire inter-groove areas are covered with cloud-form deposited substances in Example 4. Reference character e15 illustrates a void (caused due to a high aspect ratio) in Comparative Example 2. Reference character e16 illustrates a thermal sprayed material in Comparative Example 2.

Figure 7:
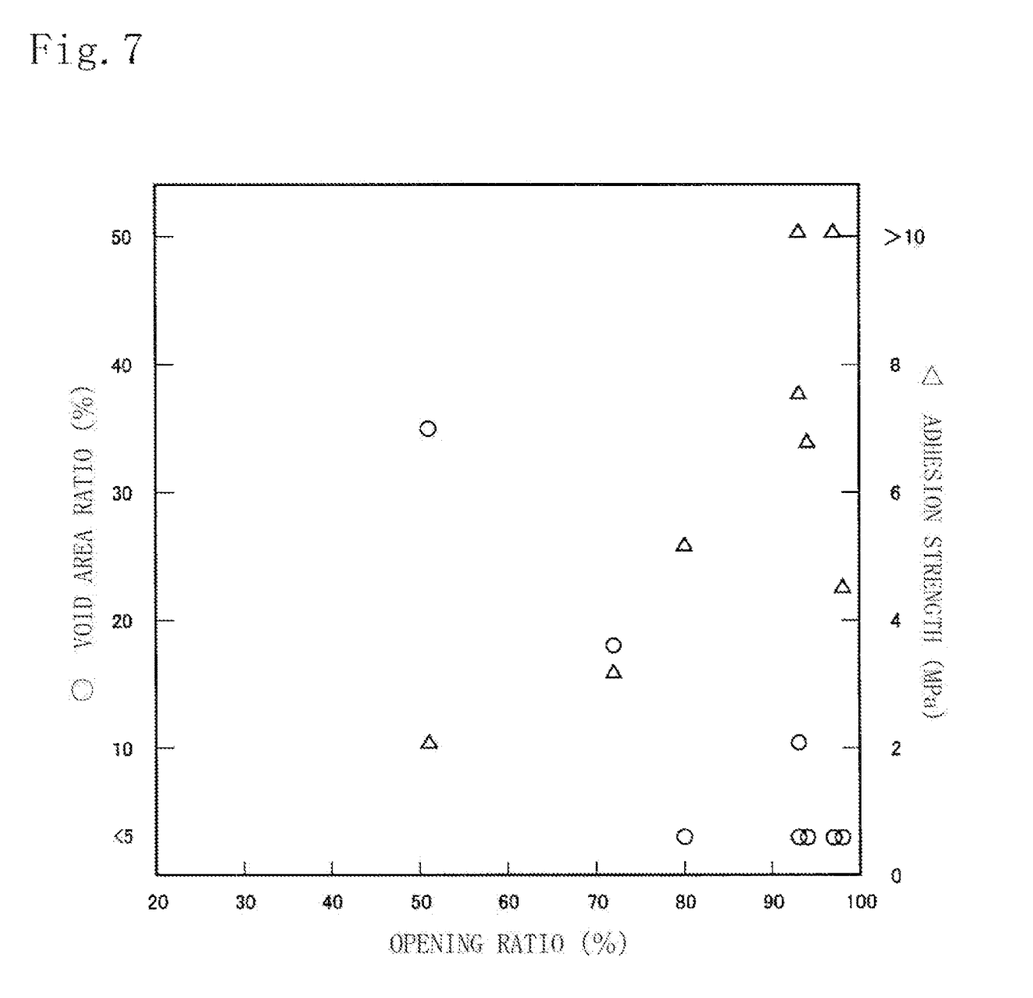
FIG. 7 is a graph illustrating test results of the test examples shown in FIG. 5.

FIG. 7 is a graph illustrating results of the test shown in FIG. 5 (Examples 1 to 7 and Comparative Example 1 shown in FIG. 5). Specifically, in FIG. 7, the horizontal axis represents the opening ratios shown in FIG. 5, the right vertical axis represents the tensile adhesion strength (adhesion strength) shown in FIG. 5, and the left vertical axis represents the void area ratios shown in FIG. 5. Also, as illustrated in FIG. 7, the results that in a case in which the opening ratios are equal to or greater than 70%, particularly equal to or greater than 80%, the adhesion strength is significantly high (equal to or greater than 3 MPa when the opening ratios are equal to or greater than 70%, and equal to or greater than 5 MPa when the opening ratios are equal to or greater than 80%) and the void area ratios are significantly low (equal to or less than 20% when the opening ratios are equal to or greater than 70%, and equal to or less than 15% when the opening ratios are equal to or greater than 80%) as compared with a case in which the opening ratios are less than 70% or particularly less than 80% are illustrated. Therefore, FIG. 7 illustrates that the aforementioned problems (1) and (2) can be solved by setting the aspect ratio to be equal to or greater than 0.5 and equal to or less than 1.3 and further setting the opening ratio to be equal to or greater than 70% or preferably equal to or greater than 80%.

As described above, according to the aforementioned embodiment, it is possible to form the grooves f which can be substantially uniformly filled with the thermal sprayed material F in the surface of the ceramic substrate C1 as illustrated in FIGS. 1 and 3 and to produce the laser treated ceramic member C2 that can strongly adhere to the thermal sprayed material F with which the grooves f are filled, by setting the aspect ratio to be equal to or greater than 0.5 and equal to or less than 1.3 and also setting the opening ratio to be equal to or greater than 70%.

In other words, if description will be given with reference to the laser treated ceramic member 201 illustrated in FIG. 4(a) (however, the laser treated ceramic member 201 is not illustrated in a state in which the aspect ratio is less than 0.5), in a case in which the aspect ratio is less than 0.5, the depth of the grooves f is excessively shallow, the thermal sprayed material thus does not enter deep parts of the laser treated ceramic member 201, and adhesion strength between the laser treated ceramic member 201 and the thermal sprayed material is not enhanced (an anchor effect does not occur between the laser treated ceramic member 201 and the thermal sprayed material) even if the grooves f of the laser treated ceramic member 201 are filled with the thermal sprayed material. On the other hand, in a case in which the aspect ratio exceeds 1.3, the depth of the grooves f is excessively deep, the deep parts of the grooves f of the laser treated ceramic member 201 are thus not filled with the thermal sprayed material, and the adhesion strength between the laser treated ceramic member 201 and the thermal sprayed material is not enhanced. However, it is possible to form the grooves f with a shape which can be substantially uniformly filled with the thermal sprayed material 103 in the surface of the substrate 102 as illustrated in FIG. 3 by the aspect ratio being equal to or greater than 0.5 and equal to or less than 1.3.

Further, if description will be given with reference to the laser treated ceramic member 201 illustrated in FIG. 4(a) (however, the laser treated ceramic member 201 is not illustrated in a state in which the opening ratio is less than 70%), in a case in which the opening ratio is less than 70%, groove blockage portions o that form spaces between the groove blockage portions o and the recessed surfaces c that are surfaces of the grooves f in the depth direction of the grooves and interrupt flowing of the thermal sprayed material into the spaces are formed in a wide range at the deposited substances (burrs) b projecting in a direction inclined in the depth direction of the grooves in the surface of the laser treated ceramic member 201. It is thus difficult for the thermal sprayed material to reach the entire parts inside the grooves f of the laser treated ceramic member 201. However, the thermal sprayed material reaches substantially the entire parts inside the grooves f without interruption by the deposited substances (burrs) b by the opening ratio being equal to or greater than 70%. In this manner, it is possible to substantially uniformly fill the grooves f (the grooves with the aspect ratio of equal to or greater than 0.5 and equal to or less than 1.3) with a shape which can be substantially uniformly filled with the thermal sprayed material with the thermal sprayed material without interruption by the deposited substances (burrs) b.

Therefore, it is possible to form the grooves which can be substantially uniformly filled with the thermal sprayed material F in the surface of the ceramic substrate C1 as illustrated in FIG. 1 and to produce the laser treated ceramic member C2 that can strongly adhere to the thermal sprayed material F with which the grooves are filled, by setting the opening ratio of the grooves with the aspect ratio of equal to or greater than 0.5 and equal to or less than 1.3 to be equal to or greater than 70%.

Also, in the aforementioned embodiment, it is possible to effectively roughen the areas between the grooves (inter-groove areas) that are adjacent to each other in the surface of the ceramic substrate C1 by the cloud-form deposited substances d1 and d2 obtained by depositing the melted or/and evaporated ceramic substrate C1 in the cloud form in the laser treatment process S1 as illustrated in FIGS. 1 and 4(b) and to enable the inter-groove areas in the surface of the laser treated ceramic member C2 to strongly adhere to the thermal sprayed material F. Moreover, it is possible to prevent the cloud-form deposited substances d1 and d2 from interrupting the filling of the entire parts inside the grooves f with the thermal sprayed material F by setting the opening ratio to be equal to or greater than 70% with the portions forming the spaces between the portions and the recessed surfaces c in the depth direction of the grooves fin the cloud-form deposited substances d1 and d2 deposited in the cloud form corresponding to the groove blockage portions o1 and o2. As such, it is possible to realize both the roughening of inter-groove areas using the cloud-form deposited substances d1 and d2 and maintenance of the high opening ratio of the grooves f and to produce the laser treated ceramic member C2 that can strongly adhere to the thermal sprayed material F at both the inter-groove areas and the parts inside the grooves f.

Further, according to the aforementioned embodiment, it is possible to prevent an oxide film from being formed on the ceramic substrate C1 during the irradiation with the laser and to produce the laser treated ceramic member C2 that does not have adverse effects during utilization due to the oxide film, by including the gas supply device 7 that supplies the non-oxidizable gas G for preventing oxidation of the surface of the ceramic substrate C1 during the irradiation with the laser to the surface of the ceramic substrate C1 as illustrated in FIGS. 1 and 2.

Further, according to the aforementioned embodiment, it is possible to substantially uniformly fill the grooves f formed in the surface of the laser treated ceramic member C2 with the thermal sprayed material F and to cause the thermal sprayed material F with which the grooves f are filled and the laser treated ceramic member C2 to strongly adhere to each other as illustrated in FIGS. 1 and 4(a). In other words, in the thermal spraying treatment, the thermal sprayed material F in a melted or half-melted state is sprayed in the depth direction of the grooves f formed in the laser treated ceramic member C2. Therefore, in a case in which the grooves f of the laser treated ceramic member C2 have a lower opening ratio due to the groove blockage portions o, the thermal sprayed material F sprayed in the depth direction of the grooves f does not reach the end portions (recessed surfaces c) of the grooves fin the depth direction due to the groove blockage portions o, and it is thus difficult to uniformly fill the grooves f with the thermal sprayed material F. However, according to the present disclosure, because of the aspect ratio and the opening ratio set within the aforementioned ranges, the thermal sprayed material F sprayed to the grooves f of the laser treated ceramic member C2 reaches substantially the entire parts inside the grooves f, and it is possible to cause the laser treated ceramic member C2 and the thermal sprayed material F to strongly adhere to each other.

Although the plurality of grooves f formed in the surface of the ceramic substrate C1 are formed into a linear treatment pattern in the aforementioned embodiment, the grooves f may be formed into a curved or circumferential treatment pattern. Also, these plurality of grooves f may be formed to intersect each other.

Note that although the ceramic treatment method illustrated in FIG. 1 includes the thermal spraying treatment process S2 in the aforementioned embodiment, it is also possible to include only the laser treatment process S1 without including the thermal spraying treatment process S2.

REFERENCE SIGNS LIST

1 Laser treatment device
2 Laser oscillator
3 Direction change mirror
4 Focusing mirror
5 X scanner
6 Y scanner
7 Gas supply device
101 Thermal spraying treated ceramic member
102 Substrate (laser treated ceramic member)
103 Thermal sprayed material
201 Laser treated ceramic member
301 Laser treated ceramic member
a Opening
b Deposited substance (burr)
c Recessed surface (bottom surface)
CS Cross section
C1 Ceramic substrate
C2 Laser treated ceramic member
C3 Thermal spraying treated ceramic member
D Depth
d1, d2 Cloud-form deposited substance
F Thermal sprayed material
f Groove
G Non-oxidizable gas
L Laser
o, o1, o2 Groove blockage portion
P Pitch
s Inter-groove surface
W1 Maximum width
W2, W2a, W2b Groove blockage width The various examples and embodiments described above can be combined in light of the above-detailed description to provide further embodiments. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A laser treatment method for ceramics comprising:
    irradiating a surface of a ceramic substrate with a laser to form a plurality of grooves in the surface and to roughen inter-groove surfaces of the ceramic substrate at the same time, wherein;

the inter-groove surfaces are located between the grooves that are adjacent to each other in the surface of the ceramic substrate, pitches between the grooves that are adjacent to each other are set to be equal to or greater than 0.05 mm and equal to or less than 0.30 mm, a width of one of the grooves progressively decreases as a depth of the one of the grooves increases starting from an opening portion of the one of the grooves, an aspect ratio represented by a ratio of the depth of the one of the grooves with respect to the width of the opening portion is set to be equal to or greater than 0.5 and equal to or less than 1.3, the inter-groove surfaces are roughened through formation of cloud-form deposited substances on the inter-groove surface, an opening ratio of the one of the grooves is calculated as a non-blockage width multiplied by 100 and divided by an opening width, the opening width is the width at a location in the opening portion where the opening ratio is calculated, the non-blockage width is a value obtained by subtracting a blockage width from the opening width, the blockage width is a length of groove blockage portions in a width direction at the location where the opening ratio calculation is performed, the groove blockage portions are portions located on one side or/and the other side of the one of the grooves in a depth direction with respect to the opening portion located at the location where the opening ratio calculation is performed in the cloud-form deposited substances, and are portions located at intervals in the depth direction with respect to a bottom surface of the one of the grooves, and in a case in which burrs are formed at the bottom surface of the one of the grooves, the groove blockage portions are portions located on one side or/and the other side of the one of the grooves in the depth direction with respect to the opening portion located at the location where the opening ratio calculation is performed in the cloud-form deposited substances and the burrs, and are portions located at intervals in the depth direction with respect to the bottom surface of the one of the grooves, and the opening ratio is equal to or greater than 70% even at a location where the opening ratio is lowest in the opening portion of the one of the grooves.

2. The laser treatment method for ceramics according to claim 1, wherein:

the cloud-form deposited substances are melted substances or/and evaporated substances deposited on the inter-groove surfaces, the melted substances are a part of the ceramic substrate melted through the irradiation with the laser and coagulating and deposited at a remaining portion of the ceramic substrate, and the evaporated substances are a part of the ceramic substrate evaporated through the irradiation with the laser and condensed and coagulating, and deposited at a remaining portion of the ceramic substrate.

3. A thermal spraying treatment method for ceramics comprising:

performing a pretreatment for thermal spraying to generate a laser treated ceramic member through irradiation of a ceramic substrate with a laser; and performing a thermal spraying treatment to cause a thermal sprayed material to adhere to the laser treated ceramic member, wherein, in the performing of the pretreatment for thermal spraying:

the laser treated ceramic member is generated by irradiating a surface of the ceramic substrate with the laser to form a plurality of grooves in the surface and roughening inter-groove surfaces of the ceramic substrate at the same time, the inter-groove surfaces are located between the grooves that are adjacent to each other in the surface of the ceramic substrate, pitches between the grooves that are adjacent to each other are set to be equal to or greater than 0.05 mm and equal to or less than 0.30 mm, a width of one of the grooves progressively decreases as a depth of the one of the grooves increases starting from an opening portion of the one of the grooves, an aspect ratio represented by a ratio of the depth of the one of the grooves with respect to the width of the opening portion is set to be equal to or greater than 0.5 and equal to or less than 1.3, the inter-groove surfaces are roughened through formation of cloud-form deposited substances on the inter-groove surfaces, an opening ratio of the one of the grooves is calculated as a non-blockage width multiplied by 100 and divided by an opening width, the opening width is the width at a location in the opening portion where the opening ratio is calculated, the non-blockage width is a value obtained by subtracting a blockage width from the opening width, the blockage width is a length of groove blockage portions in a width direction at the location where the opening ratio calculation is performed, the groove blockage portions are portions located on one side or/and the other side of the one of the grooves in a depth direction with respect to the opening portion located at the location where the opening ratio calculation is performed in the cloud-form deposited substances, and are portions located at intervals in the depth direction with respect to a bottom surface of the one of the grooves, and in a case in which burrs are formed at the bottom surface of the one of the grooves, the groove blockage portions are portions located on one side or/and the other side of the one of the grooves in the depth direction with respect to the opening portion located at the location where the opening ratio calculation is performed in the cloud-form deposited substances and the burrs, and are portions located at intervals in the depth direction with respect to the bottom surface of the one of the grooves, and the opening ratio is equal to or greater than 70% even at a location where the opening ratio is lowest in the opening portion of the one of the grooves, and wherein, in the performing of the thermal spraying treatment:

the thermal sprayed material and the laser treated ceramic member are caused to adhere to each other by filling the grooves formed in the laser treated ceramic member with the thermal sprayed material, a void area ratio of the one of the grooves is equal to or less than 20%, and the void area ratio is a proportion of a hollow volume in the one of the grooves with respect to a capacity of the one of the grooves in a state in which the grooves are filled with the thermal sprayed material.

4. The thermal spraying treatment method for ceramics according to claim 3, wherein:
the cloud-form deposited substances are melted substances or/and evaporated substances deposited on the inter-groove surfaces,
the melted substances are a part of the ceramic substrate melted through the irradiation with the laser and coagulating and deposited at a remaining portion of the ceramic substrate, and
the evaporated substances are a part of the ceramic substrate evaporated through the irradiation with the laser and condensed and coagulating, and deposited at a remaining portion of the ceramic substrate.

5. A ceramic member, wherein:
a plurality of grooves are formed in a surface of a base,
pitches between the grooves that are adjacent to each other are set to be equal to or greater than 0.05 mm and equal to or less than 0.30 mm,
a width of one of the grooves progressively decreases as a depth of the one of the grooves increases starting from an opening portion of the one of the grooves,
an aspect ratio represented by a ratio of the depth of the one of the grooves with respect to the width of the opening portion is set to be equal to or greater than 0.5 and equal to or less than 1.3,
inter-groove surfaces are located between the grooves that are adjacent to each other in the surface of the base,
cloud-form deposited substances are formed on the inter-groove surfaces,
an opening ratio of the one of the grooves is calculated as a non-blockage width multiplied by 100 and divided by an opening width,
the opening width is the width at a location in the opening portion where the opening ratio is calculated,
the non-blockage width is a value obtained by subtracting a blockage width from the opening width,
the blockage width is a length of groove blockage portions in a width direction at the location where the opening ratio calculation is performed,
the groove blockage portions are portions located on one side or/and the other side of the one of the grooves in a depth direction with respect to the opening portion located at the location where the opening ratio calculation is performed in the cloud-form deposited substances, and are portions located at intervals in the depth direction with respect to a bottom surface of the one of the grooves, and
in a case in which burrs are formed at the bottom surface of the one of the grooves, the groove blockage portions are portions located on one side or/and the other side of the one of the grooves in the depth direction with respect to the opening portion located at the location where the opening ratio calculation is performed in the cloud-form deposited substances and the burrs, and are portions located at intervals in the depth direction with respect to the bottom surface of the one of the grooves, and
the opening ratio is equal to or greater than 70% even at a location where the opening ratio is lowest in the opening portion of the one of the grooves.

6. A thermal spraying treated ceramic member comprising:
a laser treated ceramic member; and
a thermal sprayed material that is caused to adhere to the laser treated ceramic member,
wherein:
a plurality of grooves are formed in a surface of the laser treated ceramic member,
pitches between the grooves that are adjacent to each other are set to be equal to or greater than 0.05 mm and equal to or less than 0.30 mm,
a width of one of the grooves progressively decreases as a depth of the one of the grooves increases starting from an opening portion of the one of the grooves,
an aspect ratio represented by a ratio of the depth of the one of the grooves with respect to the width of the opening portion is set to be equal to or greater than 0.5 and equal to or less than 1.3,
inter-groove surfaces are located between the grooves that are adjacent to each other in the surface of the laser treated ceramic member,
cloud-form deposited substances are formed on the inter-groove surfaces,
an opening ratio of the one of the grooves is defined calculated as a non-blockage width multiplied by 100 and divided by an opening width,
the opening width is the width at a location in the opening portion where the opening ratio is calculated,
the non-blockage width is a value obtained by subtracting a blockage width from the opening width,
the blockage width is a length of groove blockage portions in a width direction at the location where the calculation is performed,
the groove blockage portions are portions located on one side or/and the other side of the one of the grooves in a depth direction with respect to the opening portion located at the location where the opening ratio calculation is performed in the cloud-form deposited substances, and are portions located at intervals in the depth direction with respect to a bottom surface of the one of the grooves, and
in a case in which burrs are formed at the bottom surface of the one of the grooves, the groove blockage portions are portions located on one side or/and the other side of the one of the grooves in the depth direction with respect to the opening portion located at the location where the opening ratio calculation is performed in the cloud-form deposited substances and the burrs, and are portions located at intervals in the depth direction with respect to the bottom surface of the one of the grooves,
the opening ratio is equal to or greater than 70% even at a location where the opening ratio is lowest in the opening portion of the one of the grooves,
the grooves formed in the laser treated ceramic member are filed with the thermal sprayed material,
a void area ratio of the one of the grooves is equal to or less than 20%, and
the void area ratio is a proportion of a hollow volume in the one of the grooves with respect to a capacity of the one of the grooves in a state in which the grooves are filled with the thermal sprayed material.

* * * * *